United States Patent
Dix et al.

(10) Patent No.: US 6,765,979 B1
(45) Date of Patent: *Jul. 20, 2004

(54) FLUID SEPARATION DEVICE FOR VENT VOLUMES OF NUCLEAR FUEL BUNDLES

(75) Inventors: Gary E. Dix, Saratoga, CA (US); Bruce Matzner, San Jose, CA (US)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,361

(22) Filed: Nov. 21, 1997

Related U.S. Application Data

(63) Continuation of application No. 08/625,884, filed on Apr. 1, 1996, now abandoned.

(51) Int. Cl.[7] .......................... G21C 3/32; G21C 15/00
(52) U.S. Cl. ................ 376/435; 376/439; 376/443; 376/444
(58) Field of Search ................ 376/435, 439, 376/443, 444

(56) References Cited

U.S. PATENT DOCUMENTS

| | | | | |
|---|---|---|---|---|
| 3,070,537 A | * | 12/1962 | Treshow | 376/443 |
| 3,847,736 A | * | 11/1974 | Bevilacqua | 376/439 |
| 3,886,038 A | * | 5/1975 | Raven | 376/439 |
| 4,698,204 A | * | 10/1987 | Taleyarkhan | 376/439 |
| 4,775,510 A | * | 10/1988 | Bryan | 376/443 |
| 5,017,332 A | | 5/1991 | Dix et al. | |
| 5,068,082 A | * | 11/1991 | Ueda et al. | 324/443 |
| 5,091,146 A | | 2/1992 | Dix | |
| 5,112,570 A | | 5/1992 | Dix et al. | |
| 5,164,155 A | | 11/1992 | Wolters et al. | |
| 5,219,519 A | | 6/1993 | Matzner | |
| 5,229,068 A | | 7/1993 | Johansson et al. | |
| 5,245,643 A | | 9/1993 | Dix et al. | |
| 5,299,245 A | * | 3/1994 | Aldrich et al. | 376/439 |
| 5,327,472 A | * | 7/1994 | Kraemer et al. | 376/439 |
| 5,345,485 A | | 9/1994 | Patterson et al. | |
| 5,365,557 A | * | 11/1994 | Meseth | 376/439 |
| 5,375,153 A | | 12/1994 | Patterson et al. | |
| 5,384,815 A | | 1/1995 | Patterson et al. | |
| 5,416,812 A | | 5/1995 | Matzner | |
| 5,668,728 A | * | 9/1997 | Dix et al. | 376/443 |
| 5,875,224 A | * | 2/1999 | Smith et al. | 376/443 |

FOREIGN PATENT DOCUMENTS

| | | | | |
|---|---|---|---|---|
| EP | 605816 | | 7/1994 | |
| EP | 619581 | | 10/1994 | |
| JP | 1029794 | * | 1/1989 | 376/444 |
| JP | 4357494 | * | 12/1992 | 376/439 |
| JP | 5157867 | * | 6/1993 | 376/443 |

OTHER PUBLICATIONS

Patent Abstracts of Japan, vol. 95, No. 10, Nov. 30, 1995; JP 07 167974.
Patent Abstracts of Japan, vol. 013, No. 201, May 23, 1991; JP 03 051796.

* cited by examiner

*Primary Examiner*—Harvey E. Behrend
(74) *Attorney, Agent, or Firm*—Nixon & Vanderhye

(57) ABSTRACT

Separation devices are disposed in the vent volume above part-length rods and above one or more of the spacers above the upper ends of the part-length rods. The separation devices preferably comprise swirlers located above the lattice openings which would otherwise receive the rods but for the underlying part-length rods. In this manner, flow is directed laterally outwardly onto the surfaces and into the interstices of the full-length fuel rods for improved power performance while simultaneously adverse pressure drops across the spacers are minimized.

19 Claims, 7 Drawing Sheets

FLUID SEPARATION DEVICE FOR VENT VOLUMES OF NUCLEAR FUEL BUNDLES

This is a continuation of application Ser. No. 08/625,884, filed Apr. 1, 1996, now abandoned.

TECHNICAL FIELD

The present invention relates to fluid separation devices for use in vent volumes within a nuclear fuel bundle and particularly to devices for flowing liquid from a path through the vent volume laterally outwardly into the interstices between and onto adjacent surrounding fuel rods with minimum pressure drop.

BACKGROUND

A typical boiling water nuclear reactor has a reactor core comprised of a plurality of fuel bundles in side-by-side relation to one another. Coolant/moderator flows upwardly within the fuel bundles and about the fuel rods within the fuel bundles where the liquid is converted to steam to produce power.

In U.S. Pat. No. 5,112,570 there is illustrated a fuel bundle having a plurality of part-length fuel rods (PLR). These PLR's are supported on the lower tie plate of each bundle and extend upwardly toward the upper tie plate. The rods, however, terminate short of the upper tie plate and typically between a pair of spacers along the fuel bundle. Between the upper end of each PLR and the upper tie plate, there is defined in the upper two-phase region of the fuel bundle a vent volume. This vent volume preferentially receives vapor from the liquid vapor two phase mixture in the upper region of the fuel bundle during power producing operations. There are many advantages associated with the use of PLR's including the increased vapor fraction within the vent volume and the pressure drop reduction in the upper two phase region of the bundle. This results in increased stability from thermal hydraulic and nuclear instabilities.

It will be appreciated that the mechanical hardware associated with fuel rod spacers causes local reduction in the flow area available for the vapor and liquid flowing through the fuel bundle. This causes significant pressure drops to occur as the flow passes each spacer. By using PLR's, the associated flow blockage effects of one or more of the full-length fuel rods extending through these spacers above the PLR is substantially eliminated. That is, because of the absence of a fuel rod at a lattice location above one or more PLR's, more flow area through the spacer is obtained with consequent reduction in pressure drop across such spacer. Further, significant flow diversion occurs into the lower pressure drop paths or vent volumes above the upper ends of the PLR's. Thus, increased vapor and liquid are pumped from surrounding flow passages, i.e., the interstitial regions around the adjacent fuel rods, into these vent volumes.

The creation of vent volumes, e.g., above PLR's, and flow diversions resulting therefrom, however, can cause some reduction in critical power performance in the fuel bundle. Additional water may accumulate in the vent volume region above the PLR and thus be shunted out of the vent volume without heat generating contact with the remainder of the full-length fuel rods. Separation devices have been utilized to drive the dense liquid or water out of the vent volumes in a generally lateral direction onto the surfaces and into the interstitial regions between the full-length fuel rods to improve heat transfer performance. Such separation devices have generally taken the form of swirlers disposed in the vent volume. These swirlers create a helical flow pattern causing the dense liquid to be driven laterally outwardly of the vent volume by centrifugal force. Such separation devices have been located within the spacers and have extended therefrom above or below the spacers or to both sides of the spacers. By locating the separation devices within the spacers, however, the devices increase the pressure drop across the spacers substantially to the same extent as if full-length fuel rods occupied those lattice positions in the vent volumes. Thus, the value of introducing PLR's in reducing the pressure drop along the length of the fuel bundle is minimized or eliminated by using conventional separation devices in the spacers above the upper ends of the PLR's which restore in part or in whole the pressure drop achieved by the use of PLR's.

DISCLOSURE OF THE INVENTION

According to the present invention, there is provided a fuel bundle for a nuclear reactor having a vent volume wherein one or more separation devices are used to direct liquid laterally onto the surfaces and into the interstices of the full-length fuel rods but without a substantial increase in the pressure drop across the spacers. By placing the separation device(s) above a spacer and leaving the opening(s) through the spacer at that lattice position(s) of the vent volume void of fuel rods, e.g., substantially unobstructed, maximization of the flow through the spacer at a minimum pressure loss while simultaneously directing additional liquid for deposition onto the surfaces of the adjacent full-length fuel rods can be achieved. The location of each separation device above a spacer thus maximizes flow diversion without substantial increase in pressure drop. That is, maximum benefits from depositing the liquid onto adjacent full-length fuel rods with minimum pressure drop are achieved by locating the separation devices just above the spacers. In addition, by streamlining the spacers and separation devices, the pressure drop can be minimized along the length of the vent volume.

In a first preferred form of the present invention, the separation device is located on top of a spacer within a vent volume and may comprise a swirler. It will be appreciated that the separation device in a broad sense need only deflect or divert the liquid flowing upwardly in the vent volume laterally outwardly onto the surfaces and into the interstices of laterally adjacent fuel rods. For that purpose, flow directing devices such as tabs, vanes and the like may be used. Thus, the separation device may have a lower end just above an opening through the spacer (the opening being in a lattice position which would otherwise have supported a fuel or moderator rod) and extend a short distance or an extended distance toward the next adjacent upper spacer.

Where the separation devices comprise the preferred swirlers, each swirler may consist of a single strip of material twisted to form a helical flow path in the vent volume sufficient to direct the heavier liquid laterally outwardly by centrifugal force onto the surfaces and into the interstices of laterally adjacent fuel rods. A more complex configuration may be provided with two or more twisted strips joined along their axes. For example, two flat strips may be slotted at opposite ends, joined along their axes and twisted with the strips maintained perpendicular along their length establishing a cruciform cross-section at any axial location. This can be characterized as a four-blade swirl device. If three strips are joined and twisted with 60° angles maintained along their length, a six-blade swirl device is established. It will be appreciated that the minimum length requirement for a swirler decreases as the number of blades are added to the swirl device. However, the surface area for friction increases with the number of blades and hence a swirl device with minimum length to minimize pressure drop is desirable. Hence, the minimum length for effective separation is that which results in a projected area covering a full 360° which in turn is a function of the number of strips and the angle through which the strips are twisted. For a single twisted strip, this requires a length equal to 180° of rotation. With a double strip configuration of a four-blade swirl device, the minimum length required is equal to 90° rotation, while a six-blade swirl device requires a length equal to 60° of rotation. In general, the minimum length required for any multi-blade swirl device is that which produces blade rotation equal to 360° divided by the number of blades thereby providing a swirl device length which minimizes pressure drop.

Additionally, the separation device may comprise an auger configuration to cause helical flow in the vent volume. Thus, one or more strips of material may be wound on its edge around a central shaft. This type of separation device may extend through one or more spacers with the auger blading extending full length on the shaft or at intervals along the shaft to locate the helical flow pattern producing part of the device just above each spacer. It may also be removable through the upper tie plate.

In another form of the present invention, it will be appreciated that twisting or winding of strips typically results in configurations with horizontal projected areas that are circular. When the separation devices are used in vent volumes, the square pitch of the fuel bundles caused by the removal of one or more fuel rods from one or more fuel bundle lattice position(s) creates a flow passage area which is rectilinear, i.e., more square than circular. Using helical flow devices with circular projected areas in each vent volume produces inefficient swirl flow patterns because of the flow which bypasses the circular cross-section. In accordance with the present invention, significant performance improvement is obtained by shaping the perimeter of the separation device such that the resultant projected area is in general conformance with the shape of the vent volume. For example, by forming the separation devices, e.g., a swirler, with outer dimensions initially larger than the flow passages and then machining it to final shape to match the cross-sectional area of the vent volume, the bypass passages may be eliminated.

It is also advantageous for a helical flow pattern to persist as far as possible toward the next spacer in order that liquid may continue to be fed onto the adjacent fuel rod surfaces. This can be assured by extending the swirl device further toward the next spacer. This, however, involves trade offs because of the adverse pressure drop created by the extended swirl device. The adverse pressure drop can be mitigated by use of a non-uniform swirl device. For example, the aggressiveness of the swirl device can be reduced by changing its pitch or diameter, i.e., reducing its diameter or increasing pitch in a vertical upward direction.

The separation devices can be permanently attached to the fuel rod spacers. This provides high performance and reliability. However, such permanent attachment precludes easy removal of underlying PLR's. Thus, the separation devices may be individually attached to a spacer as removable devices or may be attached in groups-to a removable central shaft or other structural support. The structural support may carry multiple-blades of twisted strip devices as well as auger devices.

As stated previously, separation devices which create helical swirl flow patterns can be placed above one or more PLR's in a fuel bundle lattice. When more than one such swirl flow device is utilized, the swirl devices may effect flow rotation in the same direction or different directions of flow rotation. Additionally, the separation devices are preferably placed above all fuel rod spacers in vent volumes, e.g., those created by overlying one or more PLR's. However, in many designs the local power sufficiently reduces at the top of the fuel bundle that separation devices are not required above the uppermost fuel rod spacer.

In a preferred embodiment according to the present invention, there is provided fuel bundle for a nuclear reactor comprising a plurality of spacers at axially spaced locations along the fuel bundle and having axially aligned openings, a plurality of elongated fuel rods laterally spaced from one another and extending through the selected openings of the spacers, at least one opening in one spacer along the fuel bundle being devoid of a rod and defining with surrounding rods above one spacer a vent volume, a separation device in the vent volume for flowing liquid laterally outwardly onto the surfaces and into the interstices of the surrounding rods and one opening having a flow area in excess of a flow area through each opening of the spacer containing a rod, the separation device being disposed wholly above one spacer in the vent volume to minimize the pressure drop across one spacer while directing liquid onto the surfaces and into the interstices of the surrounding rods.

In a further preferred embodiment according to the present invention, there is provided a fuel bundle for a nuclear reactor comprising a plurality of rods, including fuel rods spaced laterally from one another in a matrix thereof enabling flow of liquid about the rods from a lower end of the fuel bundle toward an upper end thereof, a plurality of spacers spaced one from the other along the fuel bundle, each spacer having openings for receiving the fuel rods and maintaining the rods spaced from one another in the matrix thereof, each opening defining with a rod through the opening a first flow area for flowing fluid through the spacer, at least one of the rods being a part-length rod terminating in an upper end below the upper ends of surrounding fuel rods and defining with respect to the surrounding fuel rods a vent volume overlying the part-length rod, at least one of the spacers disposed above the partial length rod having an opening therethrough in part defining the vent volume, a separation device disposed above one spacer in the vent volume above the partial length rod for flowing liquid laterally outwardly onto the surfaces and into the interstices of the surrounding adjacent fuel rods, the opening through the one spacer having a flow area in excess of the first flow area for minimizing the pressure drop across one spacer.

Accordingly, it is a primary object of the present invention to provide separation devices for separating liquid and vapor in one or more vent volumes of a nuclear fuel bundle in a manner which minimizes pressure drop along the length of the fuel bundle and supplies additional liquid to the surfaces and interstices of the fuel rods to optimize power production.

BRIEF DESCRIPTION OF THE DRAWING FIGURES

DESCRIPTION OF THE PREFERRED EMBODIMENTS

Figure 1:
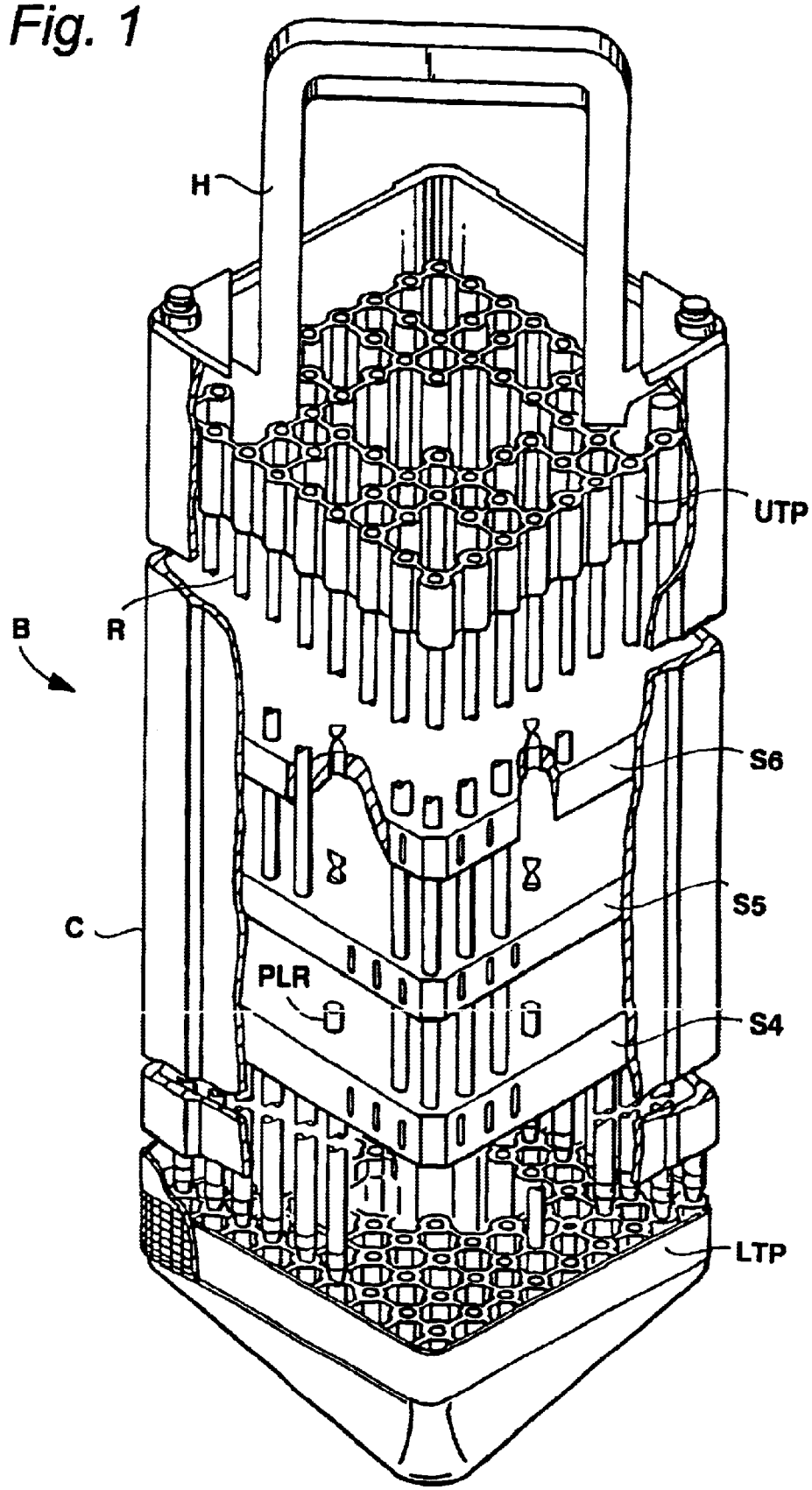
FIG. 1 is a fragmentary perspective view with portions broken out and in cross-section illustrating a nuclear fuel bundle constructed in accordance with the present invention.

Referring now to the drawings, particularly to FIG. 1, there is illustrated a nuclear fuel bundle, generally designated B, having a channel C encompassing an upper tie place UTP and a lower tie plate LTP. Within the channel C there is provided a plurality of nuclear fuel rods and moderator rods R supported on the lower tie plate LTP and which rods extend upwardly toward and to the upper tie plate UTP. A plurality of spacers S are vertically spaced one from the other throughout the height of the fuel bundle B and define discrete, vertically aligned openings at lattice positions in a regular array of such openings to receive and confine the rods R within the bundle B against lateral movement relative to one another. Generally, six or seven spacers are provided only three of which are illustrated at S4, S5 and S6 positions. Such spacers may be of the type disclosed in U.S. Pat. No. 5,209,899, of common assignee herewith, the disclosure of which is incorporated herein by reference. It will be appreciated from a review of FIG. 1 that a 9×9 array of rods R is illustrated and that other arrays may be utilized with the present invention, e.g., 8×8 or 10×10 arrays. A handle H is also illustrated for purposes of lifting the fuel bundle relative to a nuclear fuel core, not shown.

In utilizing the fuel bundle B in the core of a nuclear reactor, for example, a BWR, coolant/moderator, e.g., water, enters through the lower tie plate LTP for flow upwardly and about the rods R. During upward passage of this water, steam is generated and a vapor and liquid mixture passes upwardly through the upper tie plate UTP. During steam generation, the channel C confines the coolant/moderator flow within the nuclear flow bundle and isolates that flow from a core bypass volume flowing outside the channel C and between similarly disposed fuel bundles, not shown.

As those of skill in the art will recognize, not each lattice position of the lattice or array of openings across the spacer is occupied by a full-length fuel rod R. For example, one or more water rods or moderator rods may pass upwardly through the central portion of the bundle B and occupy a number of lattice positions. Additionally, one or more part-length rods PLR may be provided in selected lattice positions in the fuel bundle B. Thus, for example, each part-length rod may extend from the lower tie plate LTP upwardly in the fuel bundle through a spacer, for example spacer S4, and terminate just above spacer S4. Part-length rods are typically terminated in or just above the spacer to provide support for the otherwise cantilevered ends of the part-length rod.

Figure 2:
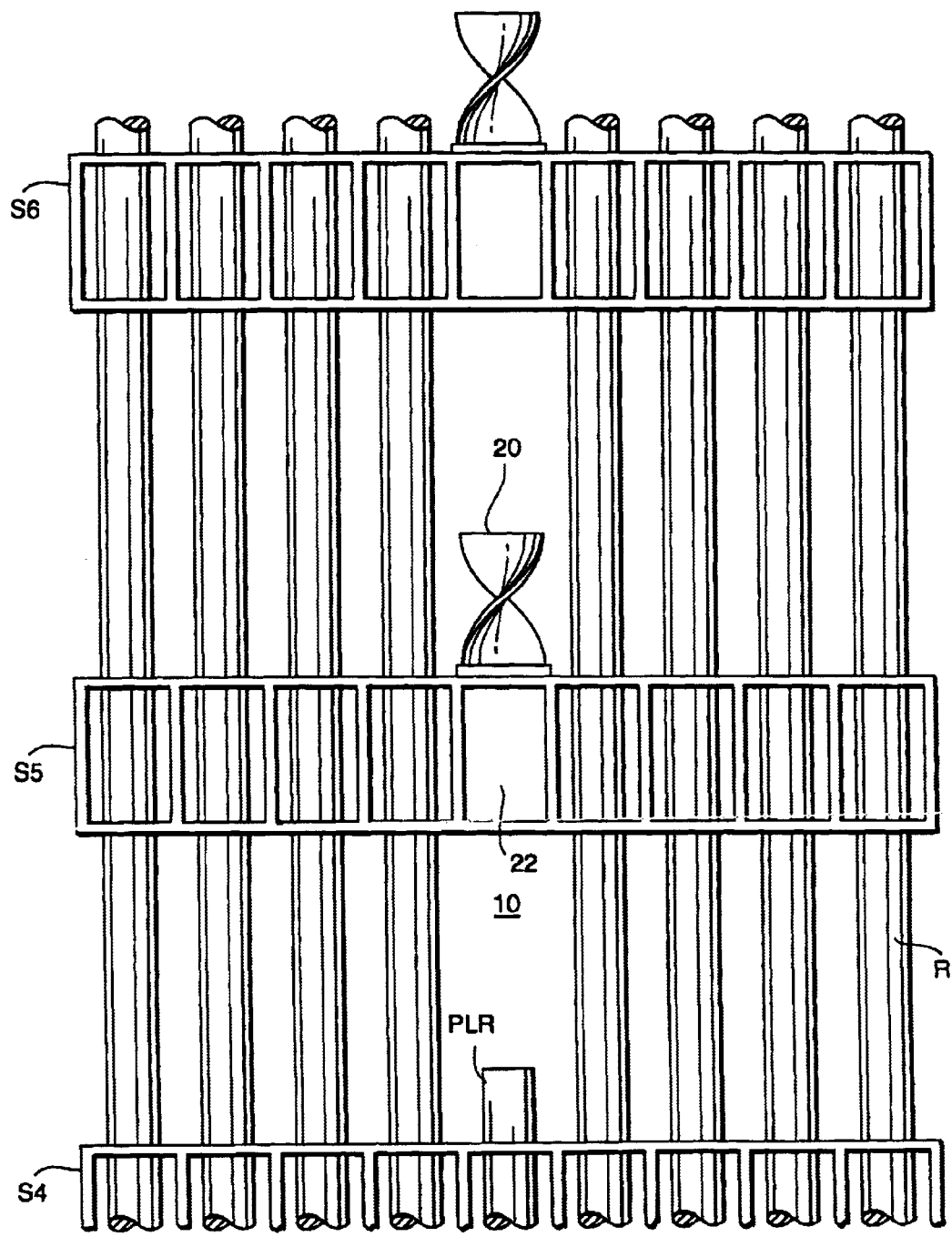
FIG. 2 is an enlarged fragmentary elevational view illustrating full and part-length fuel rods passing through a series of spacers with separation devices on certain of the spacers.

As best seen for example in FIG. 2, the termination of a part-length rod PLR for example above the spacer S4 in a certain lattice position of the 9×9 array, leaves a vent volume 10 above the upper end of the part-length rod including the superposed opening(s) of the overlying spacer(s). By employing part-length rods, the associated flow blockage effects at each lattice position above the part-length rod, which would otherwise have been occupied by a full-length rod, is eliminated. That is, the opening through the spacer above the part-length rod has a flow area therethrough as large as each flow area through the openings of the spacer without a fuel rod received therethrough, e.g., a flow area equal to the combined first area through the spacer opening with a fuel rod received therein and the flow area otherwise occupied by the fuel rod in the spacer opening. Consequently, additional flow area is provided through the vent volume 10 including through the opening(s) in the overlying spacers at the lattice position of the underlying part-length rod, thereby providing additional flow area and a reduction in pressure drop across the spacers. This reduction in pressure drop, however, diverts flow from the surrounding full-length fuel rods into the vent volume 10 which can cause reduction in critical power performance. However, the reduction in pressure drop is highly advantageous and, according to the present invention, separation devices are used to divert the flow of liquid in the vent volume laterally outwardly onto the surfaces and into the interstitial regions about the full-length fuel rods. Thus, the present invention advantageously maximizes flow diversion at locations just above the spacers while simultaneously minimizing pressure loss of the flow passing through those spacers. Consequently, according to the present invention and in a preferred embodiment, the separation devices are advantageously placed within the vent volume just above the spacers and in the lattice position which would have been occupied by a full-length rod but for the creation of a vent volume, e.g., by the installation of the part-length rod at that lattice position in underlying spacers.

Accordingly, referring to FIG. 2, there is illustrated a separation device 20 which, in the specific illustrated form, comprises a swirler. The purpose of the separation device is to deflect or divert flow laterally outwardly onto the surfaces and into the interstices of the full-length fuel rods with minimum pressure loss across the spacer. Thus, the separation device 20 is disposed just above the opening 22 in the spacer which would otherwise have been occupied by a full-length rod but for the installation of a part-length rod. Further, the separation device 20 extends in an axial direction in the vent volume 10 sufficiently only to achieve the flow diversion effect recognizing that the greater the axial length of the separation device the greater the pressure drop across the device. Therefore, the separation device 20 preferably has a very short axial length. Placing the swirler just above a spacer is preferable because the higher fluid velocities that result from the spacer flow diversion improves separation efficiency and the helical flow pattern caused by the swirler persists for a substantial distance downstream from the swirler allowing a shorter axial length of separation devices to be used. As illustrated, the separation device 20 may be repeated for each overlying spacer at each lattice position forming part of a vent volume, for example, the vent volume 10 above a part-length rod.

Figure 3:
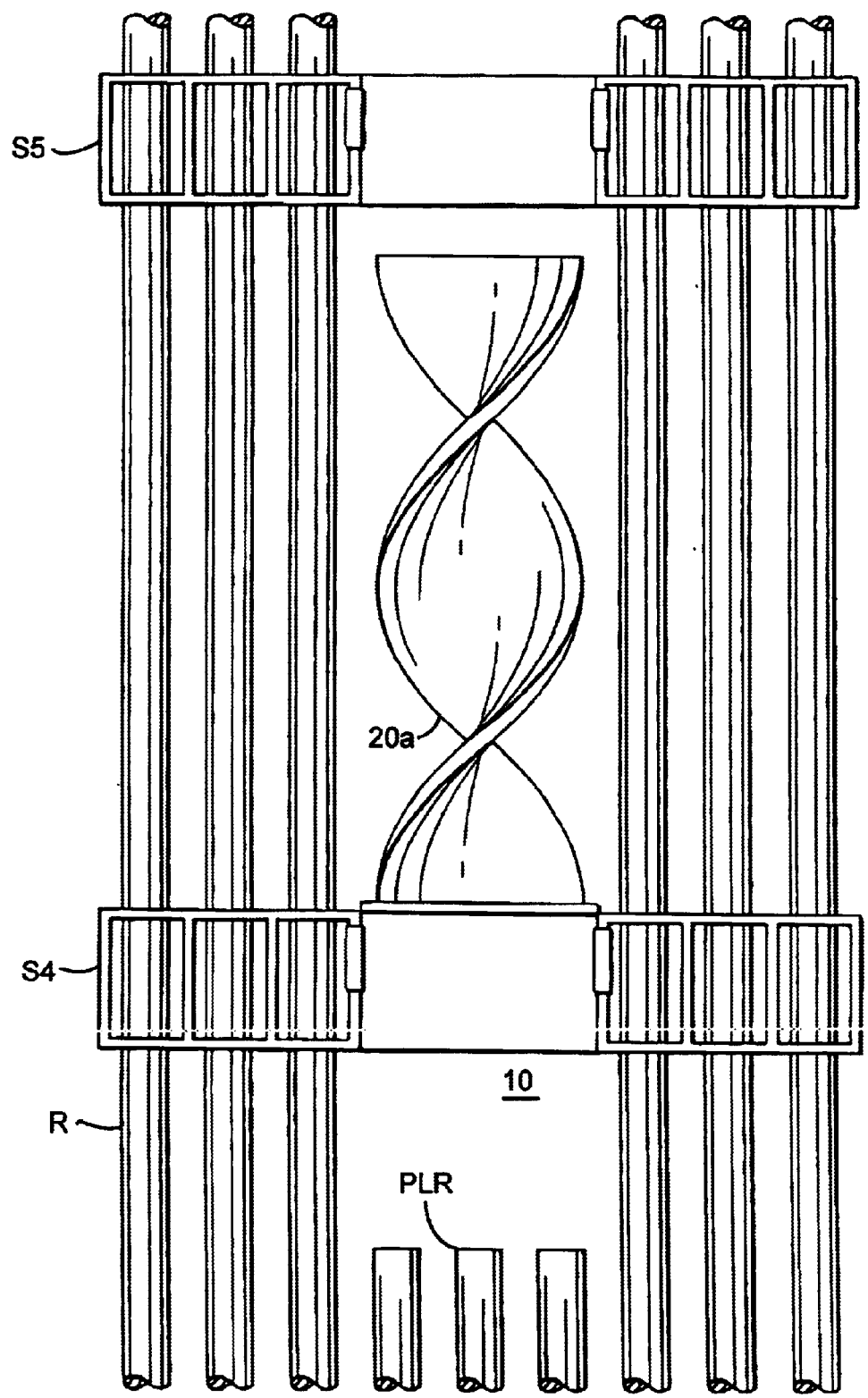
FIG. 3 is a view similar to FIG. 2 illustrating a further separation device according to the present invention.

In FIG. 3, the swirler 20*a* occupies a vent volume above several clustered part-length rods. It has also been extended toward the next adjacent spacer. This advantageously provides for the helical flow pattern to persist with substantial centrifugal forces as far as possible toward the next overlying spacer and thus the swirler continues to aggressively feed liquid onto the laterally adjacent fuel rod surfaces. While this extension of the separation device toward the next spacer advantageously enhances liquid/vapor separation, it also increases the pressure drop. The latter effect can be mitigated, however, by employing non-uniform separation devices such as the non-uniform diameter swirler illustrated in FIG. 9 discussed below.

Figure 4:
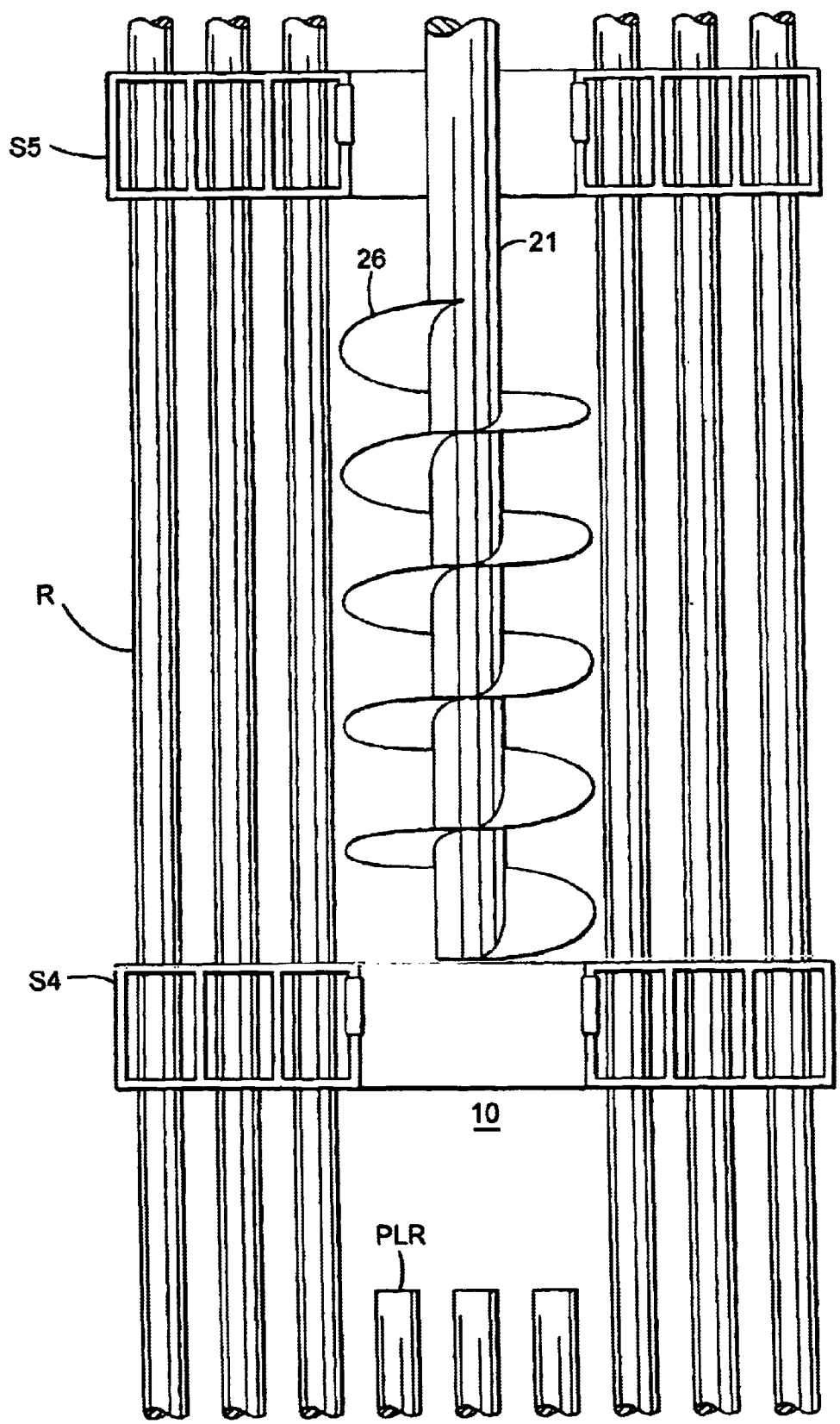
FIG. 4 is a view similar to FIG. 2 illustrating a still further separation device according to the present invention.

Referring to FIG. 4, an alternate separation device may comprise an auger mounted on a vertical shaft 24. The helical blade 26 of the auger is thus essentially wound on edge about the shaft 24, the edge of the helical blade 26 being secured to the shaft 24. Multiple flights may be used on edge about the central shaft 24. While the extension of an auger shaft through the upper tie plate and through the openings of the spacers increases the pressure drop when coolant/moderator flows through the openings of the spacers, the cross-sectional dimensions of the auger shaft can be minimized to minimize that pressure drop with the concurrent advantage that the auger can be removed from the fuel bundle through the upper tie plate. Further, the blade(s) of the auger may, but preferably do not, extend over the entire length of the shaft 24. Auger blade segments may be disposed on the shaft located for disposition just above the spacers in the vent volume 10. Also, the auger blade segments may extend only a short distance axially above the spacers, similar to the distance swirlers 20 extending above the spacers as illustrated in FIG. 2.

Figure 5A:
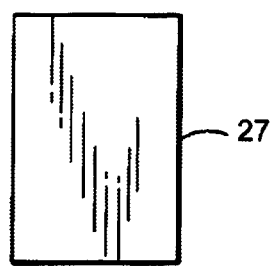
FIG. 5A illustrates a flat sheet of material which may be twisted as in FIG. 5B to form a separation device according to the present invention.
Figure 5B:
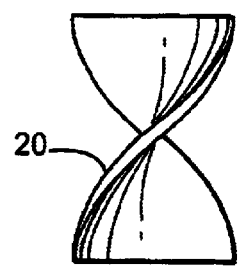
FIG. 5C is a plan view of the separation device illustrated in FIG. 5b.
Figure 5C:
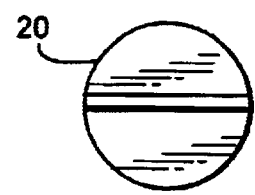
Figure 6A:
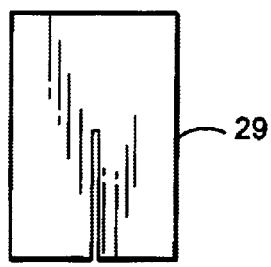
FIGS. 6A and 6B are respective side elevational views of two sheets for forming a generally cruciform swirler, the sheets being connected to one another as in FIG. 6C and twisted as in FIG. 6D.
Figure 6B:
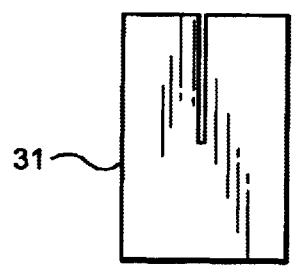
Figure 6C:
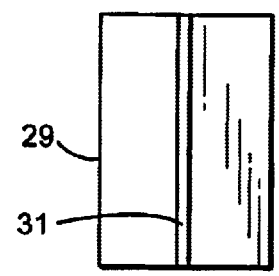
FIG. 6E is a top plan view of the swirler of FIG. 6D.
Figure 6D:
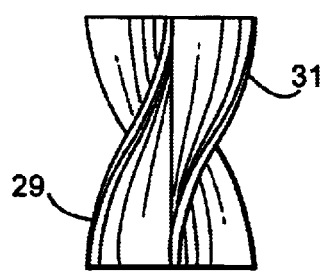
Figure 6E:
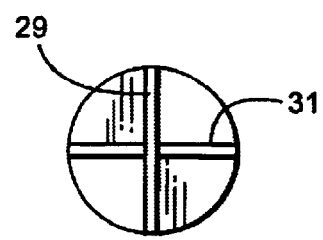

In FIGS. 5A–5C there is illustrated a preferred form of separation device comprising a swirler 20. In this simplest form of swirler, it will be appreciated that its minimum axial length for effective separation is that which results in a horizontal projected area covering a full 360°. Consequently, swirler 20 may comprise a single strip 27 of material twisted 180° between its opposite ends to form a helical vane and hence provide a helical flow pattern in the vent volume. In FIG. 5C, the periphery of the swirler defines a circular projected plan and hence a majority of the area of the vent volume occupied by the swirler is subjected to the helical flow pattern.

More complex configurations of separation devices, for example, two or more twisted strips to form more complex swirlers may be provided. Thus, in FIGS. 6A–6E, two strips of material 29 and 31 are slotted at their opposite ends and interleaved along their axes. The strips 29 and 31 are maintained perpendicular along their length and are twisted 90° to complete the full 360° horizontal projected area necessary to provide effective separation.

Figure 7A:
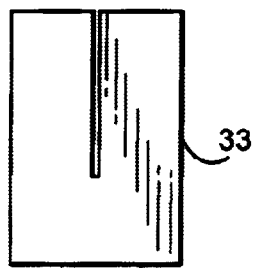
FIGS. 7A–7C are elevational views of flat sheet material assembled with one another as illustrated in FIG. 7D to form a multi-vane swirler illustrated in FIG. 7E.
Figure 7B:
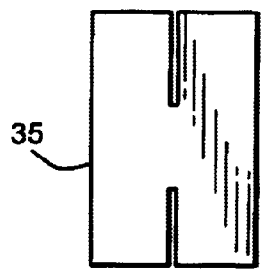
Figure 7C:
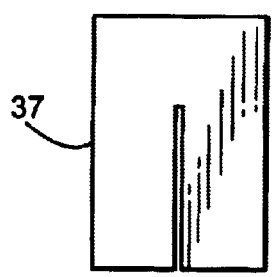
Figure 7D:
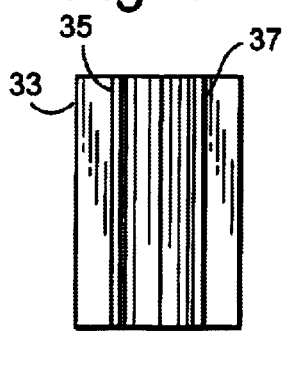
FIG. 7F is a plan view of the swirler of the FIG. 7E.
Figure 7E:
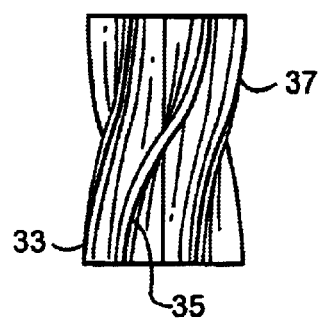
Figure 7F:
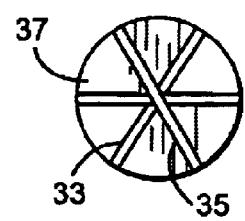

In FIGS. 7A–7F three strips 33, 35 and 37 of sheet material are slotted adjacent their ends as illustrated and joined along their axes to initially provide strips 60° apart. By rotating or twisting the strips 60°, a full 360° projected area is provided as illustrated in FIG. 7F. In the case of three strips the length of unslotted material in each strip is one-third the height of the strips. The unspotted material is at the top, middle and bottom among the three strips, to permit interlocking assembly. The same design technique is used as the number of strips increases.

Figure 8A:
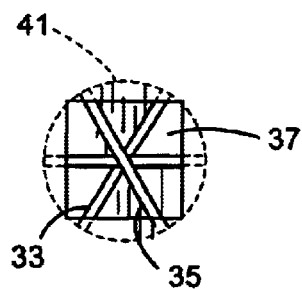
FIG. 8A is a plan view of a swirler as illustrated in FIG. 7F with its lateral circular edges cut square to conform the swirler to the general rectilinear shape of a vent volume.
Figure 8B:
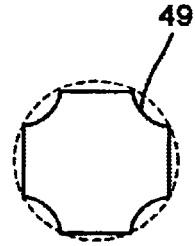
FIG. 8B illustrates the swirler with its edge cut to more closely conform to the vent volume shape.

To improve the efficiency of the swirl device, it will be recognized that in the generally rectilinear array of fuel rods, the vent volume 10 has a generally rectilinear configuration, i.e., square or rectangular. With the typical projected circular plan area of the swirler, for example, the swirler of FIG. 2, the regions between the corners of the square vent volume area and the circular projected plan area; of the swirler constitute flow bypass regions. Thus, flow upwardly into the vent volume may bypass the swirler. To provide for more efficient swirl flow patterns without flow bypass or with only minimum flow bypass, the perimeter of the separation device can be shaped to generally conform to the perimeter of the vent volume defined by the adjacent fuel rods. Thus, the generally rectilinear vent volume can be substantially covered in plan area by the separation device. To accomplish this, and as illustrated in FIG. 8A, a swirler, e.g., of the type illustrated in FIGS. 7A–7F, having a diameter corresponding to the longest diagonal of the area of the vent volume is formed. The circular edges 41 of the strips forming the swirler may be removed to form a linear swirler having a generally rectilinear projected plan view. Thus, the perimeter of the separation device is shaped so that the resultant projected area in plan closely conforms with the vent volume flow passage whereby bypass flow around the edges of the separation device is substantially eliminated. It is recognized that the circular cross-section of the adjacent fuel rods causes the edges of vent volumes to have non-linear shapes. For maximum swirler effectiveness, the projected area of the swirlers can match those shapes, as illustrated in FIG. 8B. Thus, the edges of the separation device can be rounded in plan view as illustrated at 49.

Figure 9:
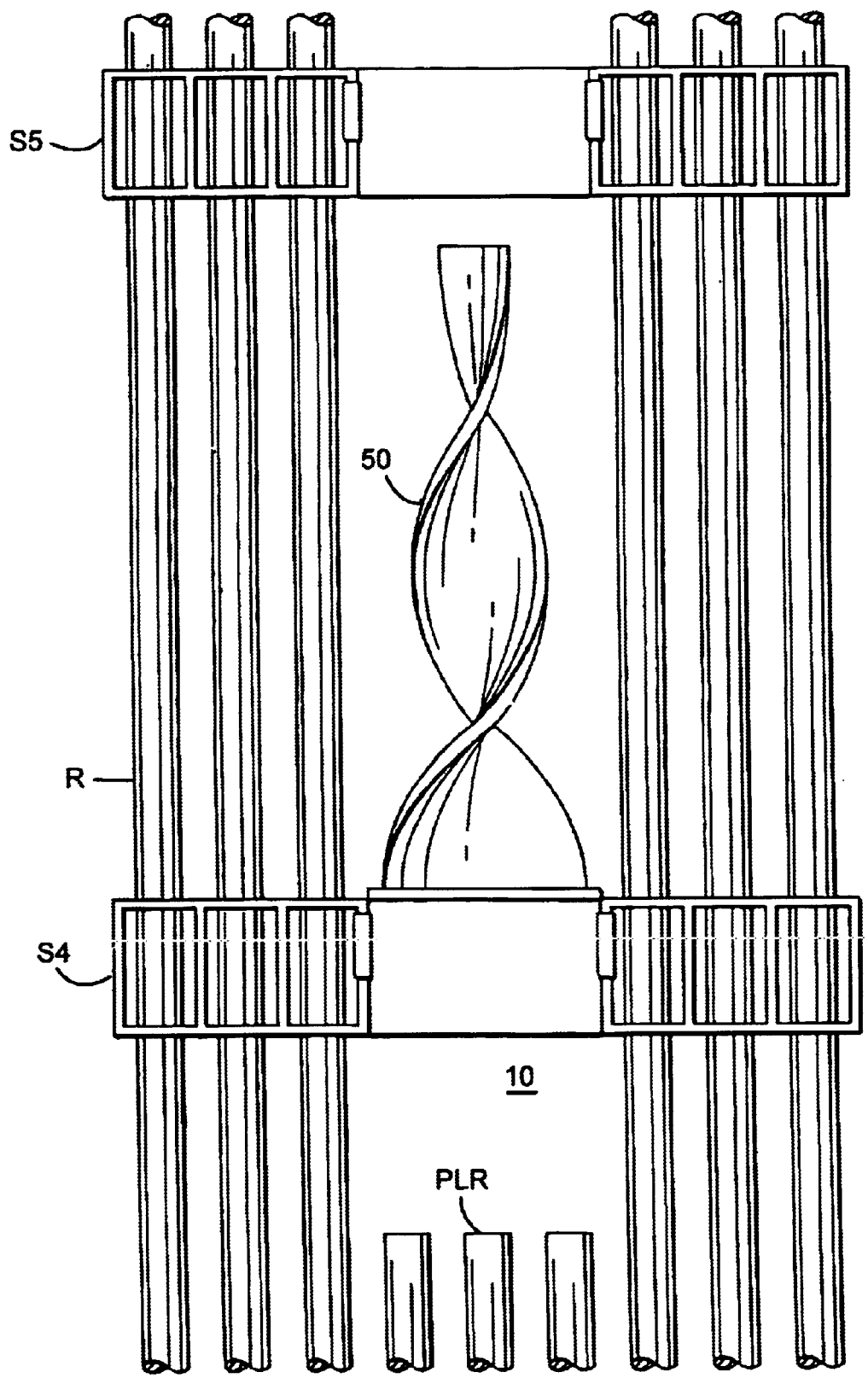
FIG. 9 is a view similar to FIG. 2 illustrating a still further form of separation device according to the present invention.

In FIG. 9, there is illustrated a separation device, e.g., in the form of a swirler 50, which extends a substantial distance above the spacer on which the swirler is mounted. Adverse pressure drop created by an axially extended swirl device can be ameliorated by using a non-uniform separation device. Thus, in this form, the swirler 50 may decrease in horizontal dimension, i.e., diameter, with the distance above the spacer or the helical pitch may vary. Specifically, the swirler illustrated in FIG. 9 has a progressively decreasing diameter with increasing distance from the spacer on which the swirler is mounted. Step-wise progression of decreasing lateral extent with increasing distance above the spacer may likewise be provided.

It will be appreciated from the foregoing that the separation devices are preferably mounted directly to the spacers for high performance and reliability. However, this prevents ready removal of the underlying part-length rod. Thus, as an alternative, the separation devices may be removably attached to the spacer or may be attached in groups to a removable central shaft or other structural support. The structural support may have the separation devices, e.g., in the form of swirlers at axially spaced positions along the support which, when inserted into the fuel bundle, align with the spacers at a location just above the upper surface of each spacer. As a further alternative, where more than one separation device is utilized, different flow patterns can be achieved. For example, the swirlers may be arranged to rotate the flow in a common direction or in opposite directions. Alternatively, various patterns of flows in opposite directions may be provided. Also, in a general sense, the necessary characteristic of a separation device according to this invention is the requirement that the device impart a lateral or horizontal component to the flow. Thus, in addition to swirlers and augers formed of one or more vanes which are twisted to form a helical pattern and a consequent helical flow pattern, the separation devices hereof may comprise discrete vanes with laterally outwardly flared edges such as, for example, the flaring bell-shaped cones or outwardly directed deflecting tabs described and illustrated in U.S. Pat. No. 5,416,812 of common assignee herewith, the disclosure of which is incorporated herein by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel bundle for a nuclear reactor comprising:
a plurality of rods including fuel rods spaced laterally from and having axes parallel to one another in a matrix thereof enabling flow of liquid about the rods from a lower end of the fuel bundle toward an upper end thereof;
a plurality of spacers spaced one from the other along the fuel bundle, each said spacer having openings for receiving the fuel rods and maintaining the rods spaced from one another in the matrix thereof, each said opening defining with a rod through said opening a first flow area for flowing fluid through said spacer;
at least one of said rods being a part-length rod terminating in an upper end below the upper ends of surrounding fuel rods and defining with respect to said surrounding fuel rods a vent volume overlying and in axial alignment with said part-length rod;
at least one of said spacers disposed above the part-length rod having an opening therethrough in axial alignment with said part-length rod and in part defining the vent volume, a separation device disposed above said one spacer in the vent volume in axial alignment with and above said part-length rod for flowing liquid laterally outwardly onto the surfaces and into the interstices of the surrounding adjacent fuel rods, said opening through said one spacer having an unobstructed flow area as large as each opening in said spacer without the fuel rod received therethrough for minimizing pressure drop across said one spacer;
said separation device including a swirler having an axis in axial alignment with the axis of said part-length rod and having a horizontal projected area in said opening of about 360° about said opening axis such that substantially all of the flow through said vent volume is intercepted by said swirler.

2. A fuel bundle according to claim 1 wherein said swirler has a lower end located at an elevation within the fuel bundle no lower than the upper surface of said one spacer.

3. A fuel bundle according to claim 1 wherein said swirler has a lower end located at an elevation within the fuel bundle just above said one spacer and spaced from said spacer.

4. A separation device according to claim 1 wherein said swirler comprises at least two strips twisted about common central axes and joined along said axes.

5. A fuel bundle according to claim 1 wherein said vent volume has a generally rectilinear horizontal cross-section, said swirler including at least one twisted vane having a horizontal projected area generally conforming to the cross-section of the vent volume thereby substantially minimizing flow through said vent volume bypassing said swirler.

6. A fuel bundle according to claim 1 wherein said swirler is attached to said one spacer.

7. A fuel bundle according to claim 1 wherein said swirler is attached to a support structure that is removable from the fuel bundle.

8. A fuel bundle according to claim 1 wherein said swirler extends vertically above said one spacer and is configured to provide a different magnitude of flow laterally outwardly at different elevations along said device.

9. A fuel bundle according to claim 1 including a plurality of spacers above said part-length rods, each said spacer above said part-length rod having an opening therethrough in axial alignment with said part-length rod and in part defining said vent volume, a swirler disposed above each said spacer in the vent volume and in axial alignment with said part-length rod, said openings through said spacers above said part-length rod having respective flow areas as large as each opening in said spacer without the fuel rod received therethrough for minimizing pressure drop across said spacers, each said swirler having an axis in axial alignment with the axis of said part-length rod and having horizontal projected areas in said openings of about 360°, such that substantially all of the flow through said volume is intercepted by said swirler.

10. A fuel bundle according to claim 1 wherein said swirler includes an element twisted about an axis and centered axially over said opening for imparting a helical flow pattern in said vent volume and having opposite side surfaces with fluid passing therealong in said helical flow pattern.

11. A fuel bundle for a nuclear reactor comprising:
a plurality of rods including fuel rods spaced laterally from and having axes parallel to one another in a matrix thereof enabling flow of liquid about the rods from a lower end, of the fuel bundle toward an upper end thereof;
a plurality of spacers spaced one from the other along the fuel bundle, each said spacer having openings for receiving the fuel rods and maintaining the rods spaced from one another in the matrix thereof, each said opening defining with a rod through said opening a first flow area for flowing fluid through said spacer;
at least one of said rods being a part-length rod terminating in an upper end below the upper ends of surrounding fuel rods and defining with respect to said surrounding fuel rods a vent volume overlying and in axial alignment with said part-length rod;
at least one of said spacers disposed above the part-length rod having an opening therethrough in axial alignment with said part-length rod and in part defining the vent volume, a separation device disposed above said one spacer in the vent volume in axial alignment with and above said one part-length rod for flowing liquid laterally outwardly onto the surfaces and into the interstices of the surrounding adjacent fuel rods, said opening through said one spacer having a flow area as large as each opening in said spacer without the fuel rod received therethrough for minimizing pressure drop across said one spacer;
said separator device including an element twisted about an axis and centered axially over said opening for imparting a helical flow pattern in said vent volume and having opposite side surfaces with fluid passing therealong in said helical flow pattern.

12. A fuel bundle according to claim 11 wherein said twisted element has a lower end located at an elevation within the fuel bundle no lower than the upper surface of said one spacer.

13. A fuel bundle according to claim 11 wherein said twisted element has a lower end located at an elevation within the fuel bundle just above said one spacer and spaced from said spacer.

14. A separation device according to claim 11 wherein said swirler comprises at least two strips twisted about common central axes and joined along said axes.

15. A fuel bundle according to claim 11 wherein said vent volume has a generally rectilinear horizontal cross-section, said twisted element having a horizontal projected area generally conforming to the cross-section of the vent volume thereby substantially minimizing flow through said vent volume bypassing said element.

16. A fuel bundle according to claim 11 wherein said element is attached to said one spacer.

17. A fuel bundle according to claim 11 wherein said element is attached to a support structure that is removable from the fuel bundle.

18. A fuel bundle according to claim 11 wherein said element extends vertically above said one spacer and is configured to provide a different magnitude of flow laterally outwardly at different elevations along said device.

19. A fuel bundle according to claim 11 wherein said twisted element presents a lower end edge between said opposite side surfaces to said opening through said spacer.

* * * * *

UNITED STATES PATENT AND TRADEMARK OFFICE
CERTIFICATE OF CORRECTION

PATENT NO. : 6,765,979 B1  
DATED : July 20, 2004  
INVENTOR(S) : Dix et al.

It is certified that error appears in the above-identified patent and that said Letters Patent is hereby corrected as shown below:

Column 7,
Line 62, delete "The unspotted material" and insert -- The unslotted material --.

Signed and Sealed this

Twenty-eighth Day of September, 2004

JON W. DUDAS
*Director of the United States Patent and Trademark Office*